United States Patent Office 3,515,786
Patented June 2, 1970

3,515,786
HYPOTENSIVE COMPOSITIONS CONTAINING A 3,4 - DIHYDRO - 1,2,4 - BENZOTHIADIAZINE - 1,1 - DIOXIDE AND A HYDRAZINO PHTHALAZINE
George de Stevens, Woodland Park, and Lincoln Harvey Werner, Summit, N.J., assignors to Ciba Corporation, Summit, N.J., a corporation of Delaware
No Drawing. Continuation-in-part of application Ser. No. 578,964, Sept. 13, 1966. This application June 2, 1969, Ser. No. 829,784
The portion of the term of the patent subsequent to Nov. 29, 1983, has been disclaimed
Int. Cl. A61k 27/00
U.S. Cl. 424—246
13 Claims

ABSTRACT OF THE DISCLOSURE

Pharmaceutical compositions comprising essentially (1) a 3,4 - dihydro - 1,2,4 - benzothiadiazine-1,1-dioxide and (2) a 1-hydrazino-phthalazine, or a therapeutically acceptable salt thereof, are useful in the management or treatment of hypertension.

CROSS REFERENCES TO RELATED APPLICATIONS

This is a continuation-in-part of application Ser. No. 578,964, filed Sept. 13, 1966, which in turn is a continuation-in-part of application Ser. No. 308,328, filed Sept. 12, 1963, which in turn is a continuation-in-part of application Ser. No. 841,052, filed Sept. 21, 1959, which in turn is a continuation-in-part of application Ser. No. 791,832, filed Feb. 9, 1959, which in turn is a continuation-in-part of application Ser. No. 764,482, filed Sept. 29, 1958, which in turn is a continuation-in-part of application Ser. No. 751,620, filed July 29, 1958, which in turn is a continuation-in-part of application Ser. No. 740,582, filed June 9, 1958, which in turn is a continuation-in-part of application Ser. No. 727,242, filed Apr. 9, 1958, which in turn is a continuation-in-part of application Ser. No. 718,452, filed Mar. 3, 1958, all of which are now abandoned.

SUMMARY OF THE INVENTION

The present invention concerns and has for its object the provision of pharmaceutical compositions, useful in the treatment of hypertension, comprising essentially:

(1) a 3,4-dihydro-1,2,4-benzothiadiazine-1,1-dioxide and
(2) a 1-hydrazino-phthalazine, or therapeutically acceptable salts thereof, as well as of methods for the preparation of said compositions and such for the treatment of hypertension with the use of said compositions.

DESCRIPTION OF THE PREFERRED EMBODIMENT

The 3,4-dihydro - 1,2,4 - benzothiadiazine-1,1-dioxides used in the invention contain in the carbocyclic portion a sulfamyl group and, in addition thereto, in the same and/or the heterocyclic portion an unsubstituted or substituted hydrocarbon radical, an amino, nitro or etherified hydroxyl group, or especially a halogen atom or a trifluoromethyl group.

More particularly said compounds may be represented by the Formula I

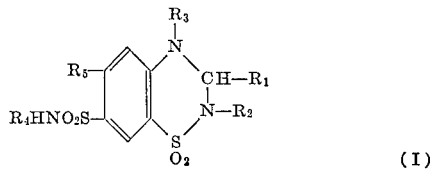

(I)

in which $R_1$ stands for hydrogen, an unsubstituted or substituted hydrocarbon radical or a heterocyclic group, each of $R_2$, $R_3$ and $R_4$ for hydrogen or an unsubstituted or substituted hydrocarbon radical and $R_5$ for an aliphatic hydrocarbon radical, a halogenated hydrocarbon radical, especially a trifluoromethyl group, or particularly a halogen atom, especially chlorine.

A hydrocarbon radical $R_1$ represents, for example, a lower aliphatic hydrocarbon radical, such as lower alkyl, e.g. methyl, ethyl, propyl, isopropyl, butyl, isobutyl, sec. butyl, tert. butyl, pentyl, isopentyl, or neopentyl, lower alkenyl, e.g. vinyl or 1-propenyl, lower alkynyl, e.g. ethinyl, a carbocyclic aliphatic hydrocarbon radical or a carbocyclic aliphatic hydrocarbon-lower aliphatic hydrocarbon radical which contains from three to seven ring-carbon atoms and one to seven chain-carbon atoms and in which the carbocyclic portion is saturated or contains one or two double bonds depending on the number of ring-carbon atoms, such as cycloalkyl or cycloalkenyl containing preferably from five to six ring-carbon atoms, e.g. cyclopentyl, cyclohexyl, 2-cyclopentenyl, 3-cyclopentenyl, 2-cyclohexenyl or 3-cyclohexenyl, or cycloalkyl-lower alkyl or cycloalkenyl-lower alkyl containing preferably from five to six ring-carbon atoms, e.g. cyclopentyl-methyl, 1- or 2-cyclopentylethyl, 1- or 3-cyclopentyl-propyl, cyclohexylmethyl, 1- or 2-cyclohexylethyl, 1- or 3-cyclohexylpropyl, 2- or 3-cyclopentenylmethyl, 1- or 2-(2 - cyclopentenyl)-ethyl, 1- or 2-(3 - cyclopentenyl)-ethyl, 1- or 3-(2-cyclopentenyl)-propyl, 1-(3-cyclopentenyl)-propyl, 2- or 3-cyclohexenylmethyl, 1- or 2-(2-cyclohexenyl)-ethyl, 1- or 2-(3-cyclohexenyl)-ethyl, 1- or 3-(2-cyclohexenyl)-propyl or 1- or 3-(3-cyclohexenyl)-propyl.

These aliphatic hydrocarbon radicals may contain additional substituents. Such substituents are primarily attached to lower alkyl radicals, and may be represented by lower alkylene containing from one to five carbon atoms, such as methylene, 1,1- or 1,2-ethylene, 1,1-dimethyl-1,2-ethylene, 1,1-, 1,2-, 1,3- or 2,2-propylene, 1,1-, 1,2-, 1,3-, 1,4-, 2,2- or 2,3-butylene, 1,5- or 2,5-pentylene.

Other substituents are, for example, one or more than one halogen atoms, e.g. fluorine, bromine, or particularly chlorine; halogeno-substituted lower alkyl radicals, representing $R_1$, are, for example, chloromethyl, 2-chloroethyl, dichloromethyl, trichloromethyl or bromomethyl.

Other substituents are amino groups, for example, primary or secondary amino groups, such as lower alkyl-amino, e.g. methylamino or ethylamino, carbocyclic aryl-amino, e.g. phenylamino, or carbocyclic aryl-lower alkyl-amino, e.g. benzylamino, or primarily tertiary amino groups, particularly di-lower alkylamino, e.g. dimethyl-amino, N-methyl-N-ethylamino, diethylamino, dipropyl-amino, di-isopropylamino or dibutylamino, N-lower alkyl-N-cycloalkylamino, e.g. N-methyl-N-cyclopentylamino or N-methyl-N-cyclohexylamino, N-lower alkyl-N-carbocyclic arylamino, e.g. N-methyl-N-benzylamino or N-methyl-N-(2-phenylethyl)-amino, lower alkyleneimino, in which er alkylene has preferably from four to six carbon atoms, such as pyrrolidino, 2-methyl-pyrrolidino, piperidino, 2-, 3- or 4-methyl-piperidino, 3-hydroxy-piperidino, 3-acetoxy-piperidino, 3-hydroxymethyl-piperidino or hexamethyleneimino, lower oxa-or aza-alkyleneimino, in which alkylene contains preferably four carbon atoms, e.g. morpholino, or piperazino, 4-methyl-piperazino, 4-hydroxyethyl-piperazino or 4-acetoxyethylpiperazino. The tertiary amino group and the lower alkyl radical to which the amino group is attached may represent together a heterocyclic radical, in which the tertiary amino group is part of the heterocyclic ring and one of the carbon atoms thereof is connected directly or through a lower alkylene radical, e.g. methylene or 1,2-ethylene, with the 3-position of the 3,4-dihydro-1,2,4-thiadiazine-1,1-dioxide portion. Such radicals are, for example, 1-methyl-3-piperidyl-methyl, 2-(1-methyl-2-piperidyl)-ethyl or 1-methyl-4-piperidyl.

Substitutents attached to aliphatic hydrocarbon, particularly lower alkyl, radicals $R_1$ are also N-acylamino groups, in which acyl is derived of organic carboxylic acids, for example, substituted carbonic acids, e.g. methoxy-, ethoxy-, or benzyloxy-carbonic acid, lower aliphatic carboxylic acids, such as lower alkanoic acids, e.g. acetic, propionic or pivalic acid, lower alkenoic acids, e.g. acrylic or methacrylic acid, lower aliphatic dicarboxylic acids, e.g. oxalic, malonic, succinic, glutaric, adipic, maleic or fumaric acid or their halfesters with lower alkanols, e.g. methanol or ethanol, carboxylic aryl-carboxylic acids, e.g. benzoic or substituted benzoic acids, carbocyclic aryl-lower aliphatic carboxylic acids, particularly aryl-lower alkanoic or alkenoic acids, e.g. phenylacetic, dihydrocinnamic or cinnamic acid, which may contain additional substituents especially in the aromatic portion. Substituents attached to these carboxylic acids are, for example, lower alkyl, e.g. methyl or ethyl, lower alkoxy, e.g. methoxy or ethoxy, lower alkylenedioxy, e.g. methylenedioxy, lower alkylmercapto, e.g. methylmercapto, sulfamyl, nitro, amino, particularly tertiary amino, such as di-lower alkylamino, e.g. dimethylamino or diethylamino, halogen, e.g. fluorine, chlorine or bromine, or halogeno-lower alkyl, e.g. trifluoromethyl. These substituents may be attached to any of the available positions; for example, monocyclic carboxylic aryl radicals may be substituted in the ortho-, meta- or para-positions, whereby one or more than one of the same or of different substituents may be present.

Acyl groups are additional substituents of aliphatic hydrocarbon, particularly lower alkyl, radicals $R_1$, primarily acyl radicals of organic carboxylic acids, such as those mentioned for the N-acylamino groups.

Other substituents attached to aliphatic hydrocarbon, particularly lower alkyl, radicals $R_1$, are hydroxyl groups. Esterified hydroxyl groups may also be suitable as substituents, especially hydroxyl groups esterified by organic carboxylic acids, for example, these mentioned above.

Further substituents of aliphatic hydrocarbon, particularly lower alkyl, radicals $R_1$, are etherified hydroxyl groups, which may be represented, for example, by aliphatic hydrocarbonoxy, such as lower alkoxy, e.g. methoxy, ethoxy, n-propoxy, isopropoxy, n-butoxy or isobutoxy, lower alkenyloxy, e.g. vinyloxy or allyloxy, carbocyclic aryloxy, e.g. phenoxy or substituted phenoxy, 1- or 2-naphthoxy or substituted naphthoxy, or carbocyclic aryl-aliphatic hydrocarbonoxy, such as aryl-lower alkoxy, e.g. benzyloxy or substituted benzyloxy. The aliphatic hydrocarbon, and particularly the carbocyclic aryl portions of the etherified hydroxy groups may contain additional substituents; such substituents are, for example, those mentioned for the carboxylic acids above.

In addition, aliphatic hydrocarbon, particularly lower alkyl, radicals $R_1$, may be substituted by an etherified mercapto group, for example, aliphatic hydrocarbon-mercapto, such as lower alkylmercapto, e.g. methylmercapto, ethylmercapto, n-propylmercapto, isopropylmercapto, n-butylmercapto or isobutylmercapto lower alkenylmercapto, e.g. vinylmercapto or allylmercapto, carbocyclic aryl-mercapto, e.g. phenylmercapto or substituted phenylmercapto, 1- or 2-naphthylmercapto or substituted naphthylmercapto, or carbocyclic aryl-aliphatic hydrocarbon-mercapto, such as aryl-lower alkylmercapto, e.g. benzylmercapto, 1- or 2-phenyl-ethylmercapto or corresponding substituted radicals as shown for the carboxylic acids above.

Apart from aliphatic hydrocarbon radicals, $R_1$ may represent carbocyclic aryl groups, such as monocyclic or bicyclic carbocyclic aryl, e.g. phenyl or substituted phenyl, 1- or 2-naphthyl or substituted naphthyl radicals, or carbocyclic arylaliphatic hydrocarbon radicals, particularly monocyclic or bicyclic carbocyclic aryl-lower alkyl, e.g. benzyl, 1- or 2-phenylethyl, 3-phenylpropyl or 1-naphthyl-methyl, or these radicals substituted especially in the aromatic portion, for example by those radicals mentioned for the carboxylic acids above.

Additional groups representing $R_1$ are heterocyclic aryl radicals, particularly monocyclic or bicyclic heterocyclic aryl radicals, such as pyridyl, e.g. 2-, 3-, or 4-pyridyl, thienyl, e.g. 2-thienyl, furyl, e.g. 2-furyl, or quinolyl, e.g. 6-quinolyl, or heterocyclic aryl-aliphatic hydrocarbon radicals, such as monocyclic heterocyclic aryl-lower alkyl, for example, thenyl, e.g. 2-thenyl. These radicals may contain additional substituents, particularly lower alkyl, e.g. methyl or ethyl, lower alkoxy, e.g. methoxy or ethoxy, or halogen, e.g. fluorine, chlorine or bromine.

The radicals $R_2$, $R_3$ and $R_4$, apart from being primarily hydrogen, may also represent lower aliphatic hydrocarbon radicals, such as lower alkyl, e.g. methyl, ethyl, propyl or isopropyl; monocyclic or bicyclic carbocyclic aryl, e.g. phenyl or 1- or 2-naphthyl; monocyclic or bicyclic carbocyclic aryl-lower alkyl, e.g. benzyl, 1-naphthyl-methyl or 2-naphthyl-methyl; or these radicals containing substituents such as those specifically mentioned for the radical $R_1$; substituted radicals are, for example, hydroxymethyl or 2-hydroxyethyl.

The radical $R_5$ stands primarily for halogen, e.g. fluorine, bromine or particularly chlorine. In addition, it may also represent lower aliphatic hydrocarbon, for example, lower alkyl, e.g. methyl or ethyl, or advantageously a substituted lower aliphatic hydrocarbon, such as a halogeno-lower alkyl radical, particularly trifluoromethyl.

Salts of the 3,4-dihydro-1,2,4-benzothiadiazine-1,1-dioxides which may also be used in this invention, are therapeutically useful salts with metals, particularly the alkali metal salts, such as those with sodium or potassium. These compounds are also described in U.S. Pats. Nos. 3,163,644 and 3,163,645.

3,4 - dihydro-1,2,4-benzothiadiazine-1,1-dioxides particularly useful in the invention, are those of the Formula I in which $R_1$ stands for hydrogen, lower alkyl, lower alkenyl, cycloalkyl and cycloalkyl-lower alkyl with 3 to 6 ring-carbon atoms, cycloalkenyl and cycloalkenyl-lower alkyl with 5 to 6 ring-carbon atoms, halogeno-lower alkyl, di-lower alkylamino-lower alkyl, lower alkanoyl-lower alkyl, lower alkoxy-lower alkyl, halogeno-lower alkoxy-lower alkyl, monocyclic carbocyclic aryloxy-lower alkyl, lower alkylmercapto-lower alkyl, halogeno-lower alkyl-mercapto-lower alkyl, monocyclic aryl-mercapto-lower alkyl, monocyclic aryl-lower alkylmercapto-lower alkyl, monocyclic carbocyclic aryl or aryl-lower alkyl, $R_2$, $R_3$ and $R_4$ each for hydrogen or lower alkyl, e.g. methyl, and $R_5$ for halogen, particularly chlorine, lower alkyl, e.g. methyl, or halogeno-lower alkyl, e.g. trifluoromethyl.

Especially valuable are those compounds of the Formula I in which each of $R_2$, $R_3$ and $R_4$ stands for hydrogen and (a) $R_1$ for hydrogen and $R_5$ for halogen, particularly chlorine, (b) $R_1$ for lower alkyl or aryl-lower alkyl, and $R_5$ for halogen, particularly chlorine, (c) $R_1$ for halogeno-lower alkyl, and $R_5$ for halogen, particularly chlorine, or halogeno-lower alkyl, particularly trifluoromethyl, (d) $R_1$ for amino-lower alkyl and $R_5$ for halogen, particularly chlorine, (e) $R_1$ for hydroxy-lower alkyl, acyloxy-lower alkyl or etherified hydroxy-lower alkyl and $R_5$ for halogen, particularly chlorine, (f) $R_1$ for a carbocyclic alicyclic hydrocarbon radical or a carbocyclic alicyclic hydrocarbon-lower aliphatic hydrocarbon radical, and $R_5$ for halogen, particularly chlorine, (g) $R_1$ for etherified mercapto-lower alkyl and $R_5$ for halogen, particularly chlorine, and (h) $R_1$ for monocyclic carbocyclic aryl-lower alkyl, and $R_5$ for halogen, especially for chlorine, and those N- derivatives of these compounds, in which one, two or all three of $R_2$, $R_3$ and $R_4$ stand for lower alkyl, particularly methyl, or the acyl radical of a carbonic or lower alkanoic acid, e.g. ethyl carbonic or acetic acid.

Another group of valuable 3,4-dihydro-1,2,4-benzothiadiazine-1,1-dioxides useful in the invention are those of the Formula II

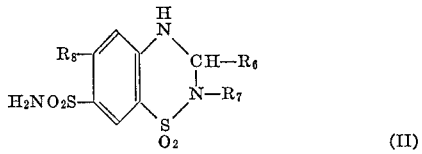

in which $R_8$ stands for chlorine or trifluoromethyl and (a) $R_6$ for hydrogen and $R_7$ for lower alkyl,
(b) each of $R_6$ and $R_7$ for lower alkyl,
(c) $R_6$ for halogeno-lower alkyl and $R_7$ for lower alkyl,
(d) $R_6$ for phenyl-lower alkyl and $R_7$ for lower alkyl,
(e) $R_6$ for hydrogen and $R_7$ for allylic lower alkenyl,
(f) $R_6$ for lower alkyl and $R_7$ for allylic lower alkenyl,
(g) $R_6$ for halogeno-lower alkyl and $R_7$ for allylic lower alkenyl,
(h) $R_6$ for phenyl-lower alkyl and $R_7$ for allylic lower alkenyl,
(i) $R_6$ for hydrogen and $R_7$ for phenyl-lower alkyl,
(j) $R_6$ for lower alkyl and $R_7$ for phenyl-lower alkyl,
(k) $R_6$ for halogeno-lower alkyl and $R_7$ for phenyl-lower alkyl and
(l) each of $R_6$ and $R_7$ for phenyl-lower alkyl.

In the compounds of the latter group the lower alkyl moiety particularly contains from one to four carbon atoms and the allylic lower alkenyl moiety from three to five carbon atoms.

Compositions of the present invention that are outstandingly useful are those that contain as the ingredient mentioned under item (1) one of the following single compounds:

6 - chloro- or 6 - trifluoromethyl-7-sulfamyl-2H-3,4-dihydro-1,2,4-benzothiadiazine-1,1-dioxide and their 3-n-butyl, 3-isobutyl, 3-(2-methyl-propyl), 3-(2-ethylmercaptoethyl), 3 - (benzylmercaptomethyl), 3 - dichloromethyl, 3-benzyl, 3-(α-methylbenzyl), 3-(2-phenyl-ethyl), 3-cyclopentyl, 3-cyclohexyl, 3-(3-cyclohexenyl), 3-cyclopropylmethyl, 3-cyclobutyl-methyl, 3-cyclopentylmethyl, 3-(2-cyclopentyl-ethyl), 3-(1-cyclopentyl-ethyl), 3-(5-norbornen-2-yl) and 3-thenyl derivatives as well as their 2-ethyl, 2-allyl, 2-n-propyl, 2-benzyl and 2-(2-pyranyl) derivatives and their 2-methyl-3-chloromethyl, 2-methyl-3-(2,2,2-trifluoroethylmercaptomethyl), 2-ethyl-3-dichloromethyl, 2-benzyl-3-chloromethyl and 2,7-bis-n-butylcarbamyl-3-chloromethyl derivatives.

The 1-hydrazino-phthalazines used in the invention and mentioned under item (2) are those described in U.S. Pats. Nos. 2,484,029 and 2,484,785, more particularly those of Formula III

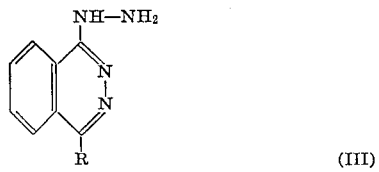

in which R stands for hydrogen, methyl or hydrazino and pharmacologically acceptable acid addition salts thereof, particularly the hydrochlorides, sulfates or methane sulfonates.

In the preparation of the compositions according to the invention one may desirably use therein about 1 to 20%, preferably about 1 to 10%, particularly about 1.5 to 2.5% of the 3,4 - dihydro - 1,2,4 - benzothiadiazine - 1,1 - dioxides and about 1 to 60%, preferably about 2 to 20%, particularly about 2.5 to 5% of the 1-hydrazinophthalazines, preferably in the form of said salts.

Orally applicable compositions, such as tablets, pills or capsules, may be compounded to contain about 10 to 100 mg., more particularly about 10 to 50 mg. of the 3,4 - dihydro - 1,2,4 - benzothiadiazine - 1,1 - dioxides and about 10 to 150 mg., more particularly about 20 to 100 mg. of the free or salified 1-hydrazino-phthalazines. Tablets may, of course, be scored to provide for fractioned dosages, if desired.

A preferred composition contains (1) about 10–25 mg. 6-chloro - 7 - sulfamyl-3,4-dihydro-2H-1,2,4-benzothiadiazine - 1,1 - dioxide or about 10 to 25 mg. 6-trifluoromethyl - 7 - sulfamyl-3,4-dihydro-2H-1,2,4-benzothiadiazine-1,1-dioxide, or about 0.6 to 20 mg. 2-methyl-3-chloromethyl - 6 - chloro - 7 - sulfamyl-3,4-dihydro-2H-1,2,4-benzothiadiazine-1,1 - dioxide, or about 0.5 to 16 mg. 3-dichloromethyl-6-chloro-7-sulfamyl-3,4 - dihydro - 2H - 1,2,4-benzothiadiazine - 1,1 - dioxide, or about 0.25 to 8 mg. 2 - methyl-3-(2,2,2-trifluoroethylmercaptomethyl)-6-chloro - 7 - sulfamyl-3,4-dihydro-2H-1,2,4-benzothiadiazine-1,1-dioxide, or about 0.25 to 4 mg. 3-(5-norbornen-2-yl)-6-chloro-7-sulfamyl - 3,4-dihydro-2H-1,2,4-benzothiadiazine-1,1-dioxide, or about 0.6 to 100 mg. 3-benzyl-6-trifluoromethyl-7-sulfamyl-3,4-dihydro-2H - 1,2,4 - benzothiadiazine-1,1-dioxide and (2) about 10–30 mg. 1-hydrazinophthalazine or 1,4-dihydrazino-phthalazine in its free or salified form. It is convenient for administration and may normally be administered 1 to 3 times a day, but administration may vary with the needs of each particular patient and is best determined by the physician in each case.

The formation of the compositions of this invention, which may be, for example, tablets, pills, dragees or capsules, is carried out in the manner normally employed in the art, usually by combining the active ingredients mentioned under (1) and (2) with pharmaceutically acceptable inorganic or organic excipients suitable especially for enteral administration. These include carriers, binders, fillers, lubricants, stabilizers, preservants, wetting agents, solution promoters or retarders, salts for regulating the osmotic pressure, buffers, colors and the like. Examples of such carrier materials are starches, e.g. corn starch, wheat starch, arrowroot starch and the like, sugars, e.g. lactose, sucrose and the like, stearic acid or salts thereof, e.g. magnesium stearate, calcium stearate and the like, aluminum magnesium silicate preparations (colloidal silica preparations), basic aluminum salts, e.g. aluminum dihydroxyallantoinate, talcum, tragacanth, acacia, polyethylene glycol and the like. The quantities of these ingredients may vary widely and depend upon the physical characteristics (e.g. softness and the like) and size of the orally applicable composition, the method of its manufacture and the like. Encapsulation may also be effected using, if necessary, the same excipients as those employed for the manufacturing of the tablets. Any compatible color, approved and certified under the provisions of the Federal Food, Drug and Cosmetic Law may be used as a means of identification and the like.

The tablet, capsule or pill for oral use may be enterically coated and such coating is effected in the standard manner, using standard enteric coating agents. Thus, agents, such as gelatin (alone or hardened with formaldehyde), cellulose esters and ethers, shellac, fats or fatty acids containing a disintegrating solid, such as magnesium oxide or other standard enteric coating materials, may be used. Preferably, one may utilize cellulose esters or esterethers, such as those described in U.S. Pat. No. 2,196,768, as well as the procedure described therein. Other coating materials and procedures useful in the invention are those, for example, described in the U.S. Pats. Nos. 2,071,511 and 2,205,111. Particularly satisfactory enteric coating materials are those described in the U.S. Pat. No. 2,196,768, page 1, right-hand column, line 21, through page 2, left-hand column, line 2.

The compositions of the invention may also provide for a prolonged and sustained effect. For example, tablets, such as those described in U.S. Pat. No. 2,887,738, may contain the pharmacologically active ingredient embedded in a pharmaceutically acceptable waxy core (for prolonged absorption in the lower intestine), around which is compressed a granulated mixture of the active ingredient together with a pharmaceutically acceptable carrier (for immediate absorption in the stomach). Or, capsules having prolonged effects may contain micro-pills containing small amounts of the pharmacologically active ingredient with coats of different rates of degradation. These long-acting preparations are prepared according to well-known methods.

If desired, the compositions of the invention may contain other therapeutically valuable substances, for example, other hypotensive agents, such as Rauwolfia and related alkaloids, e.g. reserpine, deserpidine, rescinnamine or the carbethoxy-syringate of methyl reserpate (syrosingopine), guanethidines, e.g. 2-heptamethylene-imino-ethylguanidine or other related guanidines covered in U.S. Pat. No. 2,928,829, spironolactones, e.g., 3-(3-oxo-7α-acetylthio-17β-hydroxy-4-androsten-17α-yl) - propionic acid-µ-lactone, barbiturates, e.g. sodium 5-sec.-butyl-5-ethyl-barbiturate or sodium 5-ethyl-5-phenyl-barbiturate, protoveratrines, e.g. protoveratrine A, or purines, e.g. theobromine or the theophylline choline salt.

Following are working examples, illustrative of, but in no way intended to limit the present invention. Unless otherwise indicated, all parts, wherever given in the specification are parts by weight. All sieve sizes are U.S. Standard sieve sizes.

Example 1

Material and formula: 10,000 tablets, grams
- 6-chloro-3,4-dihydro-7-sulfamyl-2H - 1,2,4-benzothiadiazine - 1,1 - dioxide (hydrochlorothiazide) _____ 250.00
- 1-hydrazino-phthalazine _____ 250.00
- Lactose spray dried _____ 1862.50
- Cornstarch _____ 125.00
- Magnesium stearate USP _____ 12.50

*Procedure for preparation.*—Combine all the ingredients and mix together in a suitable vessel. Screen through a No. 20 sieve. Compress into tablets weighing 250 mg., using $^{11}/_{32}$ inch punches and dies.

Example 2

Substituting 1,4-dihydrazino-phthalazine for the 1-hydrazino-phthalazine in Example 1 and following the identical procedure given in that example, the analogous composition may be obtained.

Example 3

Core material and formula: 10,000 tablets, grams
- 1-hydraziro-phthalazine _____ 500.00
- Tragacanth USP _____ 40.00
- Lactose USP _____ 1290.00
- 50% 3A alcohol, q.s.
- Corn starch _____ 100.00
- Talc USP _____ 60.00
- Magnesium stearate USP _____ 10.00

*Procedure for preparation.*—Mix together in a suitable vessel the 1-hydrazino-phthalazine, tragacanth and lactose. Wet with sufficient 50% 3A alcohol to form granules. Pass the moist mass through a No. 8 screen and dry with circulating air at 100° F. until the moisture content is 2 percent or less. Break the granules on a No. 20 screen and mix with the corn starch, talc and magnesium stearate. Compress into core tablets weighing 200 mg., using $^{10}/_{32}$ inch punches and dies in a Manesty Drycota tablet press.

Coating material and formula: 10,000 tablets, grams
- 6 - chloro - 3,4 - dihydro - 7 - sulfamyl - 2H-1,2,4 - benzothiadiazine - 1,1 - dioxide (hydrochlorothiazide) _____ 125.00
- Lactose spray dried _____ 3116.00
- Confectioners sugar _____ 70.00
- Corn starch (anhydrous basis) _____ 154.00
- Stearic acid powder USP _____ 35.00
- Purified water, q.s.

*Procedure for preparation.*—Mix together the hydrochlorothiazide, lactose, confectioners sugar, stearic acid, and 88 grams of dried corn starch. Suspend 66 grams of dried corn starch in 90 ml. cold purified water and make a paste by adding 360 ml. boiling purified water. Wet down the mixed powders with this paste, using additional water if necessary. Force the moist mass through a No. 8 screen and dry at 110° F. with circulating air until moisture content is 2 percent. Break the granules on a No. 12 screen and compress 350 mg. of this material around each core, using $^{13}/_{32}$ inch punches and dies in a Manesty Drycota tablet press.

Example 4

Substituting 1,4 - dihydrazino-phthalazine for the 1-hydrazino-phthalazine in Example 3 and following the identical procedure given in that example, the analogous composition may be obtained.

Example 5

Material and formula: 10,000 tablets, grams
- 6 - chloro - 3,4 - dihydro - 7 - sulfamyl - 2H-1,2,4 - benzothiadiazine - 1,1 - dioxide (hydrochlorothiazide) _____ 250.00
- 1 - hydrazino - phthalazine _____ 1000.00
- Lactose spray dried _____ 1112.50
- Corn starch _____ 125.00
- Magnesium stearate USP _____ 12.50

*Procedure for preparation.*—Combine all the ingredients and mix together in a suitable vessel. Screen through a No. 20 screen. Compress into tablets weighing 250 mg., using $^{11}/_{32}$ inch punches and dies.

Example 6

Material and formula: 10,000 tablets, grams
- 6 - chloro - 3,4 - dihydro - 7 - sulfamyl - 2H-1,2,4 benzothiadiazine 1,1 dioxide (hydrochlorothiazide) _____ 200.00
- 1 - hydrazino - phthalazine _____ 1500.00
- Lactose spray dried _____ 675.00
- Corn starch _____ 125.00
- Magnesium stearate USP _____ 12.50

*Procedure for preparation.*—Combine all the ingredients and mix together in a suitable vessel. Screen through a No. 20 screen. Compress into tablets weighing 250 mg., using $^{11}/_{32}$ inch punches and dies.

Example 7

Material and formula: 10,000 tablets, grams
- 6 - chloro - 3,4 - dihydro - 7 sulfamyl - 2H-1,2,4 - benzothiadiazine - 1,1 - dioxide (hydrochlorothiazide) _____ 250.00
- 1 - hydrazino-phthalazine _____ 500.00
- Lactos spray dried _____ 1612.50
- Corn starch _____ 125.00
- Magnesium stearate USP _____ 12.50

*Procedure for preparation.*—Combine all the ingredients and mix together in a suitable vessel. Screen through a No. 20 screen. Compress into tablets weighing 250 mg., using $^{11}/_{32}$ inch punches and dies.

Example 8

Coating material and formula: 10,000 tablets, grams
- 1 - hydrazino-phthalazine _____ 250.00
- Tragacanth USP _____ 40.00
- Lactose USP _____ 1290.00
- 50% 3A alcohol, q.s.
- Corn starch _____ 100.00
- Talc USP _____ 60.00
- Magnesium stearate USP _____ 10.00

*Procedure for preparation.*—Mix together in a suitable vessel the 1-hydrazino-phthalazine, tragacanth and lactose. Wet with sufficient 50% 3A alcohol to form granules. Pass the moist mass through a No. 8 screen and dry with circulating air at 100° F. until the moisture content is 2 percent or less. Break the granules on a No. 20 screen and mix with the corn starch, talc and magnesium stearate. Compress into core tablets weighing 175 mg., using $^{19}/_{32}$ inch punches and dies in a Manesty Drycota tablet press.

Coating material and formula: 10,000 tablets, grams
- 6 - chloro - 3,4 - dihydro - 7 - sulfamyl-2H-1,2,4 - benzothiadiazine - 1,1 - dioxide (hydrochlorothiazide) _____ 1000.00
- Lactose spray dried _____ 2241.00
- Confectioners sugar _____ 70.00
- Corn starch (anhydrous basis) _____ 154.00
- Stearic acid powder USP _____ 35.00
- Purified water, q.s.

*Procedure for preparation.*—Mix together the hydrochlorothiazide, lactose, confectioners sugar, stearic acid, and 88 grams of dried corn starch. Suspend 66 grams of dried corn starch in 90 ml. cold purified water and make a paste by adding 360 ml. boiling purified water. Wet down the mixed powders with this paste, using additional water if necessary. Force the moist mass through a No. 8 screen and dry at 110° F. with circulating air until moisture content is 2 percent. Break the granules on a No. 12 screen and compress 350 mg. of this material around each core, using $^{13}/_{32}$ inch punches and dies in a Manesty Drycota tablet press.

Example 9

Substituting 1,4-dihydrazino-phthalazine or 1-hydrazino-4-methyl-phthalazine for the 1-hydrazino-phthalazine in Example 6 and following the identical procedure given in that example, the anologous composition may be obtained.

Example 10

Substituting 1,4 - dihydrazino-phthalazine for the 1-hydrazino-phthalazine in Example 7 and following the identical procedure given in that example, the analogous composition may be obtained.

Example 11

Core material and formula: 1,000,000 tablets, kg.
- 1 - hydrazino - phthalazine _____ 25.000
- Acacia powder USP _____ 2.000
- Polyethylene glycol 6000 _____ 2.000
- Lactose spray dried _____ 64.990
- Corn starch _____ 5.000
- Stearic acid powder USP _____ 1.000
- D&C yellow No. 10 _____ 0.010
- Purified water, q.s.

*Procedure for preparation.*—Place the 1 - hydrazino-phthalazine, corn starch, stearic acid and lactose spray dried, which have been previously screened through a No. 16 screen, into a suitable mixer and mix for 20 minutes. Make a mucilage of acacia in 10 lts. of hot purified water, then add the polyethylene glycol 6000 and dissolve it in the mucilage with gentle heat and agitation. Add the colors previously dissolved in 1 lt. of water and mix well with the granulating liquid. Granulate, using the No. 11002 nozzle, add sufficient water through the nozzle until granulation is complete. Allow to mix thoroughly at slow speed until proper granules are formed. Pass the moist mass through a No. 4A screen on the Fitzpatrick mill. Place on trays and dry at 100° F. to desired moisture content. Pass granules through No. 16 screen on the Tornado. Compress into core tablets weighing 100 mg., using $^{8}/_{32}$ inch F.F. beveled edge punches.

Coating material and formula: 1,000,000 tablets, kg.
- 6 - chloro - 3,4-dihydro-7-sulfamyl-2H-1,2,4-benzothiadiazine-1,1-dioxide (hydrochlorothiazide) _____ 15.000
- Acacia powder USP _____ 2.000
- Polyethylene glycol 4000 monostearate _____ 2.000
- Confectioners sugar _____ 10.000
- Lactose spray dried _____ 168.940
- Stearic acid powder USP _____ 2.000
- FDC red No. 1 _____ 0.010
- FDC yellow No. 5 _____ 0.050
- Purified water, q.s.

*Procedure for preparation.*—Mix the hydrochlorothiazide with the confectioners sugar and an equal weight of lactose spray dried and pass through a Fitzpatrick mill at medium speed using a No. 16 mesh screen. Place this mixture into the Readco along with the remainder of the spray dried lactose and the stearic acid which has been previously screened. Make a mucilage with acacia in 10 lts. of hot purified water, then add the polyethylene glycol 4000 monostearate and dissolve it in the mucilage with gentle heat and agitation. Add the colors previously dissolved in 1 lt. of water to the granulating liquid and mix well. Granulate, using the No. 11002 nozzle, add sufficient purified water through the nozzle until the granulation is complete. Allow to mix thoroughly at slow speed until the proper granules are formed. Pass the moist mass through a No. 4A screen on the Fitzpatrick mill. Place on trays and dry at 100° F. until the moisture content is at the desired level. Pass granules through a No. 20 screen on the Tornado mill. Compress 200 mg. coating around the core, using $^{11}/_{32}$ inch F.F. beveled edge punches. Each tablet to weigh a total of 300 mg.

Example 12

Preparation of 2 million coated tablets—

Core formulation material: Kg.
- 1-hydrazino-phthalazine hydrochloride _____ 50.00
- Acacia powder _____ 4.00
- Corn starch _____ 10.00
- Color FD&C yellow No. 5 _____ 0.02
- Lactose, spray dried _____ 129.98
- Polyethylene glycol 6000 _____ 4.00
- Stearic acid powder _____ 2.00
- Deionized water, 21.00 lt.

Coating formulation:
- 6 - trifluoromethyl - 3,4-dihydro-7-sulfamyl-2H-1,2,4-benzothiadiazine-1,1-dioxide _____ 30.000
- Acacia powder _____ 4.000
- Color FD&C red No. 2 _____ 0.002
- Color FD&C yellow No. 5 _____ 0.020
- Color FD&C yellow No. 6 _____ 0.080
- Lactose, spray dried _____ 337.898
- Polyethylene glycol 4000 monostearate _____ 4.000
- Stearic acid powder _____ 4.000
- Sugar, confectioner's _____ 20.000
- Deionized water, 24.000 lt.

*Procedure for the core.*—Place the hydrochloride, lactose, corn starch and stearic acid, all previously screened through a 16 mesh screen, in the Readco mixer. Mix for 20 minutes at low speed (34 r.p.m.).

Dissolve the acacia in 19 lt. of hot deionized water. Melt the polyethylene glycol 6000 on a water bath and, when melted, add to the acacia solution. Dissolve the color FD&C yellow No. 5 in 2.0 lt. of hot deionized water and add to the acacia solution. Place this solution into the pressure cylinder and spray into the Readco mixer using a Teejet No. 11002 nozzle at 60 pounds/square inch of nitrogen gas. Granulate for 40 minutes total time, or until granules form.

Pass the wet mass through a Fitzpatrick comminuting machine set at low speed, knives forward, using a Type A—No. 4A screen. Place on trays and dry using 38° C. (100° F.) heat and circulating, dehumidified air.

When moisture content as determined by the Cenco Moisture Balance is 2.0%–3.0%, grind using a Tornado comminuting machine using a No. 16 mesh screen, 2 knives, and low speed. Granulation is now ready for compressing.

*Procedure for the coating.*—Blend the benzothiadiazine and approximately 30 kg of lactose and pass through a Fitzpatrick comminuting machine set at medium speed, knives forward, using a Type C—No. 16 screen. Place this in the Readco mixer and add the balance of the lactose, confectioner's sugar and stearic acid powder, all previously screened through a 16 mesh screen.

Dissolve the acacia in 20 lt. of hot deinoized water. Melt the polyethylene glycol 4000 monostearate on a steam bath to 90° C. and add to the acacia solution. Dissolve the color FD&C red No. 2 in 2 lt. of hot deionized water and color FD & C yellow No. 5 and color FD &C yellow No. 6 in 2 lt. of hot deionized water and add the yellow color solution, then the red color solution, to the acacia solution and heat to 80° C.

Place this solution into the pressure cylinder, preheated with hot deionized water, and spray into the Readco mixer using a Teejet No. 11002 nozzle at 60 pounds/square inch of nitrogen gas. Granulate for 40 minutes total time, or until granules form and no red spots are visible.

Pass the wet mass through a Fitzpatrick comminuting machine at low speed, knives forward, using a Type A—No. 5 screen. Place on trays and dry at 38° C. (100° F) with circulating, dehumidified air.

When the moisture content as determined by the Cenco Moisture Balance is between 2.0% and 3.0%, grind the granules using a Tornado comminuting machine, set at medium speed, 6 knives, using a 25 mesh screen. Granulation is now ready for compressing.

The compressed core tablets weigh 100 mg. and are 8/32 inch in diameter, having a thickness of approximately 2.8 mm. The coated tablets weigh 300 mg. and are 11/32 inch in diameter, having a thickness of approximately 3.7 mm.

One may substitute an equivalent amount of the diuretic benzothiadiazine-1,1-dioxide used in the examples, for that of the other compounds specifically listed in column 11.

We claim:

1. A pharmaceutical composition in oral dosage unit form, comprising essentially (1) about 1 to 20% of 2-$R_2$-3-$R_1$-4-$R_3$-6-$R_5$-7-(N-$R_4$-sulfamyl) - 3,4 - dihydro-2H-1,2,4-benzothiadiazine-1,1-dioxide in which $R_1$ stands for a member selected from the group consisting of hydrogen, lower alkyl, cycloalkyl-lower alkyl with 3 to 6 ring-carbon atoms, cycloalkenyl and cycloalkenyl-lower alkyl with 5 to 6 ring-carbon atoms, halogeno-lower alkyl, lower alkylmercapto-lower alkyl, phenyl-mercapto-lower alkyl, phenyl-lower alkylmercapto-lower alkyl, 2,2,2-trifluoroethylmercaptomethyl and phenyl-lower alkyl, $R_2$, for a member selected from the group consisting of hydrogen and lower alkyl, $R_3$ and $R_4$ for hydrogen and $R_5$ for a member selected from the group consisting of halogen and halogeno-lower alkyl, and (2) about 1 to 60% of a member selected from the group consisting of 1-hydrazino-phthalazine, 1-hydrazino - 4 - methyl-phthalazine, 1,4-dihydrazino-phthalazine and a pharmacologically acceptable acid addition salt thereof.

2. A pharmaceutical composition as claimed in claim 1 comprising essentially about 1 to 10% of the ingredient shown under (1) and about 2 to 20% of the ingredient shown under (2).

3. A pharmaceutical composition as claimed in claim 1, comprising essentially about 1.5 to 2.5% of the ingredient shown under (1) and about 2.5 to 5% of the ingredient shown under (2).

4. A pharmaceutical composition as claimed in claim 1, comprising essentially about 10 to 50 mg. of the ingredient shown under (1) and about 10 to 150 mg. of the ingredient shown under (2).

5. A pharmaceutical composition as claimed in claim 1, comprising essentially about 10 to 50 mg. of the ingredient shown under (1) and about 20 to 100 mg. of the ingredient shown under (2).

6. A pharmaceutical composition as claimed in claim 1, comprising essentially about 10 to 25 mg. of 6-chloro-7-sulfamyl-3,4-dihydro-2H - 1,2,4 - benzothiadiazine-1,1-dioxide and about 10 to 30 mg. of a member selected from the group consisting of 1-hydrazino-phthalazine and 1,4-dihydrazino-phthalazine.

7. A pharmaceutical composition as claimed in claim 1, comprising essentially about 10 to 25 mg. of 6-trifluoromethyl-7-sulfamyl-3,4-dihydro - 2H - 1,2,4-benzothiadiazine-1,1-dioxide and about 10 to 30 mg. of a member selected from the group consisting of 1-hydrazino-phthalazine and 1,4-dihydrazino-phthalazine.

8. A pharmaceutical composition as claimed in claim 1, comprising essentially about 0.6 to 20 mg. of 2-methyl-3-chloromethyl-6-chloro-7-sulfamyl - 3,4 - dihydro - 2H-1,2,4-benzothiadiazine-1,1-dioxide and about 10 to 30 mg. of a member selected from the group consisting of 1-hydrazino-phthalazine and 1,4-dihydrazino-phthalazine.

9. A pharmaceutical composition as claimed in claim 1, comprising essentially about 0.5 to 16 mg. of 3-dichloromethyl-6-chloro-7-sulfamyl - 3,4 - dihydro - 2H-1,2,4-benzothiadiazine-1,1-dioxide and about 10 to 30 mg. of a member selected from the group consisting of 1-hydrazino-phthalazine and 1,4-dihydrazino-phthalazine.

10. A pharmaceutical composition as claimed in claim 1, comprising essentially about 0.25 to 8 mg. of 2-methyl-3-(2,2,2-trifluoroethyl-mercaptomethyl)-6-chloro - 7 - sulfamyl-3,4-dihydro-2H-1,2,4-benzothiadiazine - 1,1-dioxide and about 10 to 30 mg. of a member selected from the group consisting of 1-hydrazino-phthalazine and 1,4-dihydrazino-phthalazine.

11. A pharmaceutical composition as claimed in claim 1, comprising essentially about 0.25 to 4 mg. of 3-(5-norbornen-2-yl)-6-chloro-7-sulfamyl - 3,4 - dihydro - 2H-1,2,4-benzothiadiazine-1,1-dioxide and about 10 to 30 mg. of a member selected from the group consisting of 1-hydrazino-phthalazine and 1,4-dihydrazino-phthalazine.

12. A pharmaceutical composition as claimed in claim 1, comprising essentially about 0.6 to 100 mg. of 3-benzyl-6-trifluoromethyl-7-sulfamyl - 3,4 - dihydro - 2H - 1,2,4-benzothiadiazine-1,1-dioxide and about 10 to 30 mg. of a member selected from the group consisting of 1-hydrazino-phthalazine and 1,4-dihydrazino-phthalazine.

13. A pharmaceutical composition as claimed in claim 1, comprising essentially about 15 mg. of 6-chloro-7-sulfamyl-3,4-dihydro-2H-1,2,4-benzothiadiazine-1,1 - dioxide and about 25 mg. of a member selected from the group consisting of 1-hydrazino-phthalazine and 1,4-dihydrazino-phthalazine.

References Cited

UNITED STATES PATENTS 3,340,150   9/1967   De Stevens et al. _____ 424—246

ALBERT T. MEYERS, Primary Examiner

V. D. TURNER, Assistant Examiner

U.S. Cl. X.R.

424—250

CASE SU-181/D/1-5

PO-1050
(5/69)

UNITED STATES PATENT OFFICE
CERTIFICATE OF CORRECTION

Patent No. 3,515,786          Dated June 2, 1970

Inventor(s) GEORGE deSTEVENS ET AL

It is certified that error appears in the above-identified patent and that said Letters Patent are hereby corrected as shown below:

Column 2, line 58, "er" should be --- lower ---.

Column 3, line 29, "carboxylic" should be --- carbocyclic ---.

Column 9, line 2, "coating" should be --- Core ---.

Column 11, line 55, "11" should be --- 6 ---.

Column 12, line 10, "50" should be --- 100 ---.

SIGNED AND
SEALED
MAR 9 1971

(SEAL)
Attest:

Edward M. Fletcher, Jr.
Attesting Officer

WILLIAM E. SCHUYLER, JR.
Commissioner of Patents

Disclaimer 3,515,786.—*George De Stevens,* Woodland Park and *Lincoln Harvey Werner,* Summit, N.J. HYPOTENSIVE COMPOSITIONS CONTAINING A 3,4-DIHYDRO-1,2,4-BENZOTHIADIAZINE-1,1-DIOXIDE AND A HYDRAZINO PHTHALAZINE. Patent dated June 2, 1970. Disclaimer filed Feb. 20, 1981, by the assignee, *Ciba-Geigy Corp.*

The term of this patent subsequent to Mar. 31, 1981, has been disclaimed.
[*Official Gazette May 19, 1981.*]